United States Patent [19]

Baird

[11] Patent Number: 5,709,049
[45] Date of Patent: Jan. 20, 1998

[54] GROUND COVER AND METHOD OF MAKING

[76] Inventor: Donald L. Baird, P.O. Box 146, Los Olivos, Calif. 93441

[21] Appl. No.: 635,682

[22] Filed: Apr. 22, 1996

[51] Int. Cl.⁶ ..................................................... A01G 17/00
[52] U.S. Cl. .......................................... 47/27; 47/25
[58] Field of Search ........................... 47/25, 25 R, 27, 47/48.5 G, DIG. 13

[56] References Cited

U.S. PATENT DOCUMENTS

| | | |
|---|---|---|
| 1,739,426 | 12/1929 | Stripling . |
| 2,105,800 | 1/1938 | Watkins ................. 47/DIG. 13 X |
| 2,909,328 | 10/1959 | Babyak ................. 47/25 R X |
| 2,949,698 | 8/1960 | Downey et al. . |
| 3,482,609 | 12/1969 | Neckerman . |
| 4,495,723 | 1/1985 | Wasserman ........... 47/DIG. 13 X |
| 4,642,938 | 2/1987 | Georges et al. ............ 47/25 X |
| 4,794,726 | 1/1989 | Fawcett . |
| 4,932,157 | 6/1990 | Shimp ................ 47/DIG. 13 X |
| 4,995,192 | 2/1991 | DeWid . |
| 5,058,317 | 10/1991 | McMurtrey . |
| 5,212,905 | 5/1993 | Philoctete ................. 47/25 X |
| 5,231,793 | 8/1993 | Allen . |
| 5,375,368 | 12/1994 | Motz, Jr. . |

FOREIGN PATENT DOCUMENTS

| | | | |
|---|---|---|---|
| 551758 | 12/1959 | Belgium ........................ 47/25 |
| 1378663 | 12/1974 | United Kingdom ............ 47/25 R |
| 9001256 | 2/1990 | WIPO ........................... 47/25 |

OTHER PUBLICATIONS

Baird, Donald L, "Water Wonder" brochure, 1993.

*Primary Examiner*—Terry Lee Melius
*Assistant Examiner*—Christopher J. Novosad
*Attorney, Agent, or Firm*—Leo F. Costello

[57] ABSTRACT

A ground covering enclosure for obscuring undesired vegetation around plants and inanimate objects upstanding from the ground and for promoting the growth of a plant when the object is a plant. The cover includes a water and light pervious, vegetation impervious membrane, preferably a plastic weed cloth, for receiving a plant or other object in circumferential engagement therewith and preferably incorporating an insect barrier; a heat-absorbing wall, in one embodiment an annular cut-out section of a used automobile tire or otherwise made of recycled used-tire rubber, maintained by its inherent weight in engagement with the ground circumferentially of the object or nearly so, and supposing the membrane in relatively closely spaced relation to the ground so that the object, the membrane and the ground form a chamber around the base of the object; and a hose mounted on the inside of the wall and within the chamber for delivering water and/or other liquid-borne nutrients to the ground around a plant. A micro-climate can thus be created in the chamber, similar to a greenhouse or hothouse, close to the ground at the base of the plant and directly over the root system, thereby promoting plant growth while obscuring undesired vegetation while having inherent stability without need for separate anchoring.

31 Claims, 3 Drawing Sheets

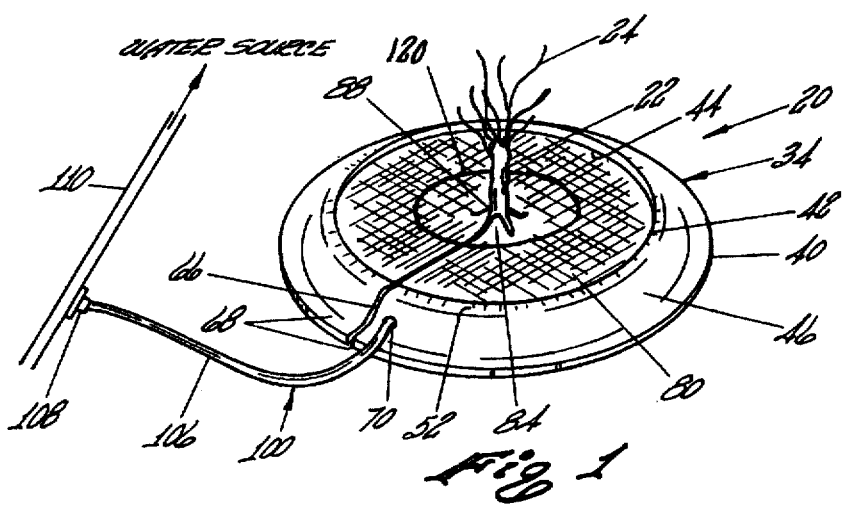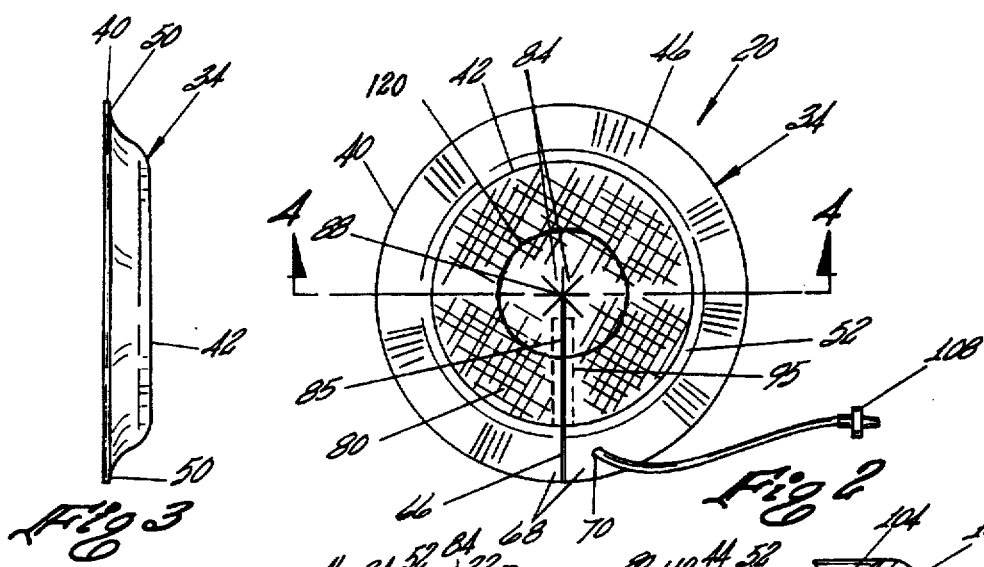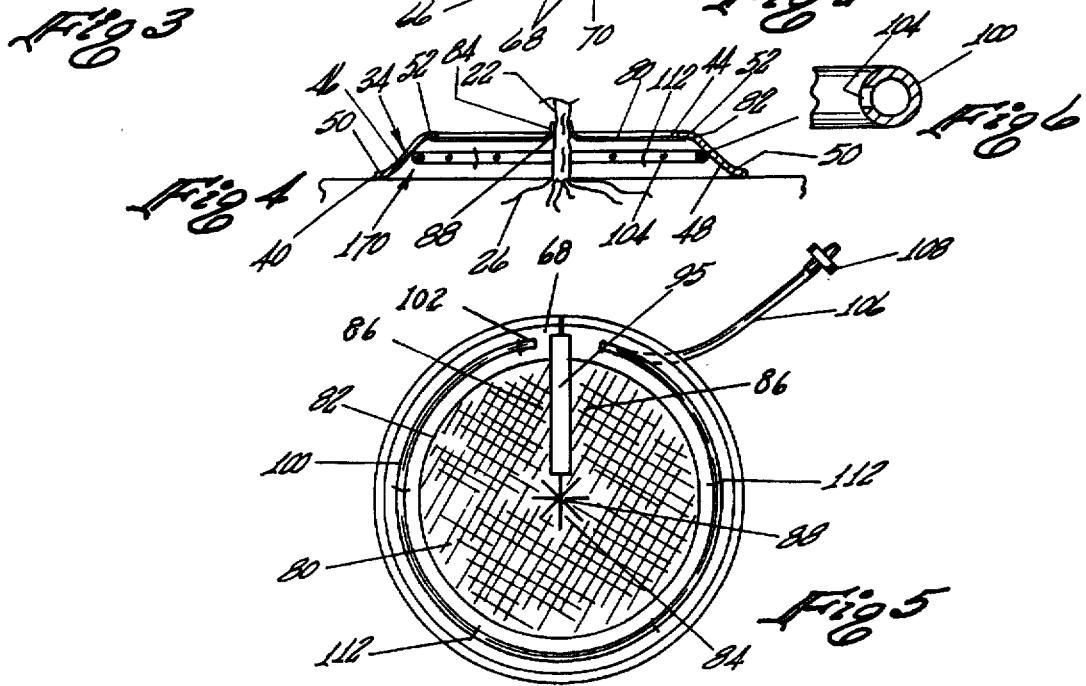

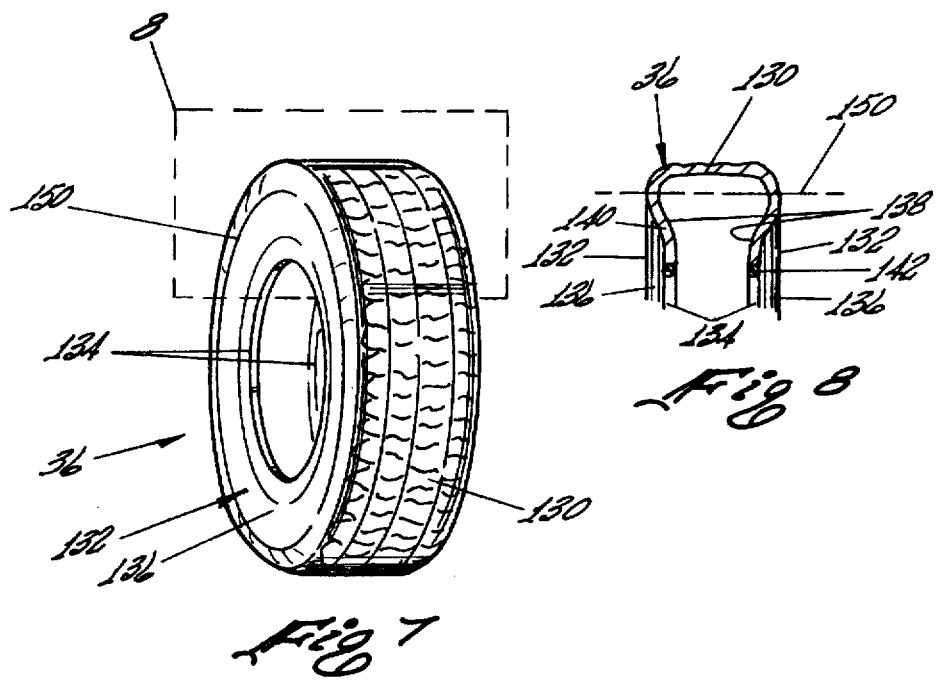
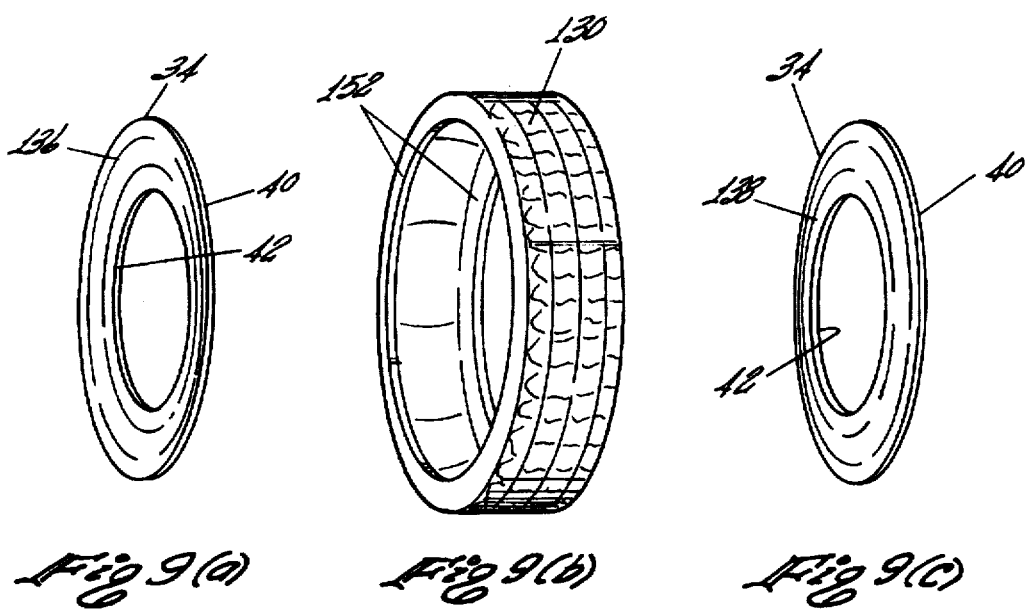

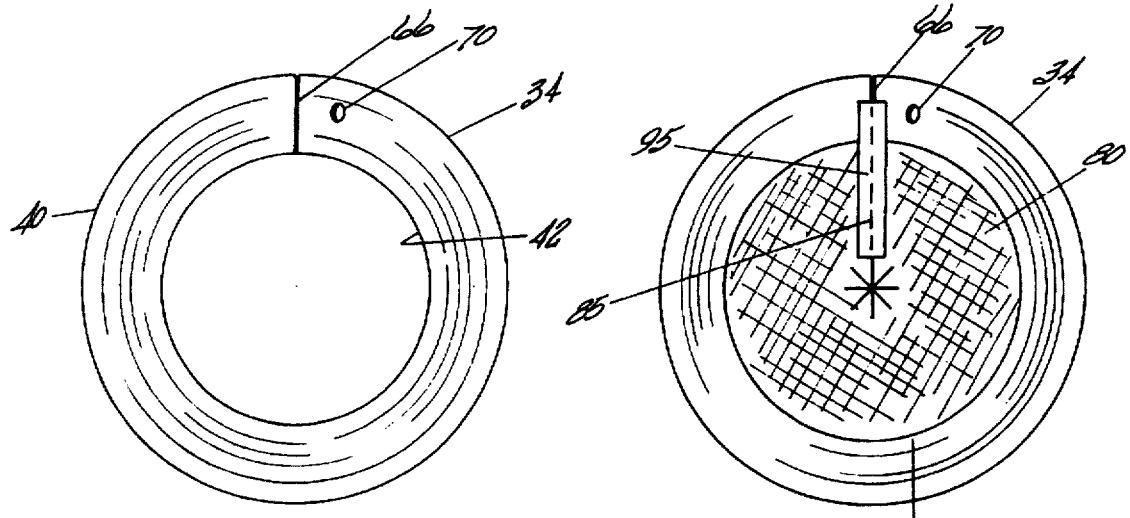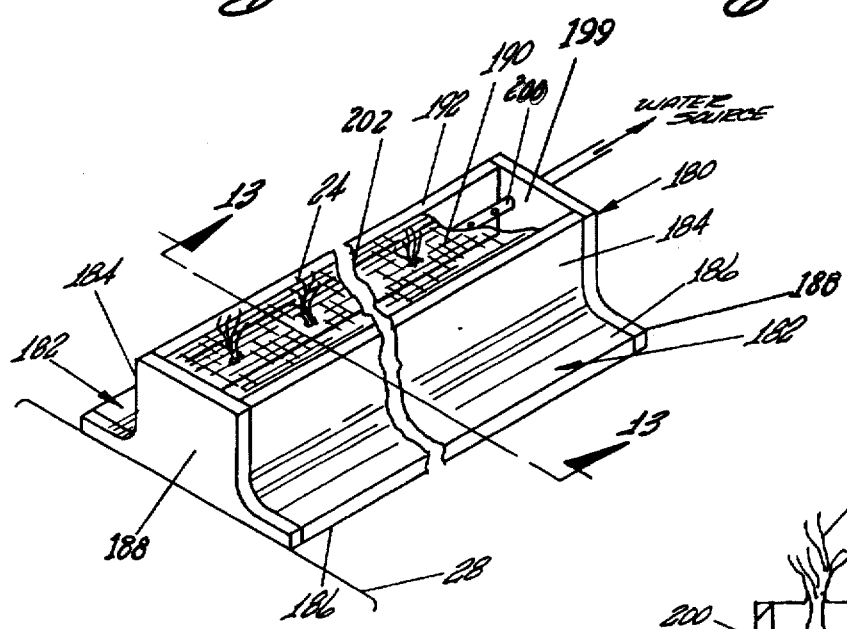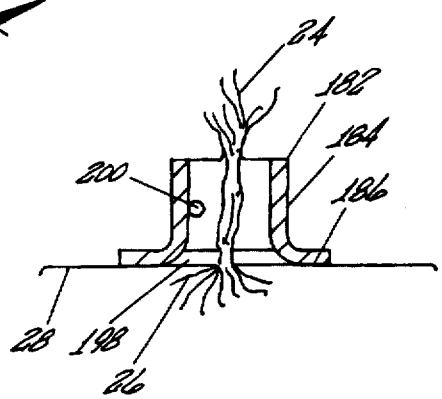

5,709,049

GROUND COVER AND METHOD OF MAKING

FIELD OF THE INVENTION

The present invention pertains to a ground cover and to a method of making the same and more particularly to a ground cover for controlling growth around the base of a plant or an inanimate object upstanding from the ground, and to a method of recycling used automobile tires to make various embodiments of the ground cover.

BACKGROUND

Each year millions of used automobile tires are added to the supply of scrap rubber. Part of this scrap rubber is reclaimed by manufacturers of rubber products and, for example, is used in limited amounts to manufacture certain other rubber products. Not all of the ever-increasing stock of used tires is thusly recycled, however, and much of what remains is often piled high in huge, unsightly mounds of used tires. These mountains of tires are usually placed in locations zoned for dumping, but they are still a blight on the landscape. Great controversies have erupted about these piles of tires among those living in the surrounding areas, but as with many other waste products, practical solutions for their disposal have not been forthcoming.

Apart from waste disposal, beautifying the landscape is a continuing task in public areas, such as in parks and along streets and roads, insofar by controlling the growth of vegetation, both desired and undesired, is concerned. The most obvious problem concerns the unsightly growth of weeds around trees, fire hydrants, telephone poles, and the like. Perhaps less obvious is the failure to obtain desired growth of trees and other plants. These problems are difficult to solve because the required maintenance is so labor-intensive, because of the health hazards of chemical treatments and other environmental concerns and conditions, and also because of scarcity of water in certain areas of the world.

Still further, it is well known that young plants and seedlings, in particular, whether grown in the garden or the field, require special treatment to promote growth under adverse environmental conditions including temperature extremes, high winds, soil quality, insect invasion, and competing weeds. It is also important to be able to provide a desired cover or envelope of protection over and around such a plant but also to insure that the envelope is secure and stable and not easily disturbed.

The subject ground cover at once offers an answer to the foregoing problems in a way not heretofore known. Plant or ground covers for use around trees have of course been known, such as disclosed in the Stripling U.S. Pat. No. 1,739,426; the Fawcett et al. U.S. Pat. No. 4,794,726; the McMurtrey U.S. Pat. No. 5,058,317; the Allen U.S. Pat. No. 5,231,793, and the Motz U.S. Pat. No. 5,375,368. These devices, however, do not optimize growing conditions for young plants while obscuring weeds, they lack inherent stability, and none involves recycling of used automobile tires. Thus, they all have disadvantages overcome by the present invention.

SUMMARY

A ground cover or enclosure is provided for obscuring undesired vegetation around plants as well as inanimate objects upstanding from the ground and for promoting the growth of a plant when the object is a plant. The cover includes a water and light pervious, vegetation impervious membrane, preferably a plastic weed cloth, adapted to receive a plant or other object in circumferential engagement therewith; a heat-absorbing wall, in one embodiment an annular cut-out section from a used automobile tire or otherwise made of recycled used-tire rubber, maintained by its inherent weight in engagement with the ground circumferentially of the object or nearly so, and supporting the membrane in relatively closely spaced relation to the ground so that the object, the membrane and the ground form a chamber or envelope around the base of the object; and a hose mounted on the inside of the wall and within the chamber for delivering water and/or other liquid-borne nutrients to the ground around a plant. A micro-climate of higher temperature and humidity is thus created in the chamber, similar to a greenhouse, but close to the ground at the base of the plant and directly over the root system, thereby to promote plant growth in the ground area under the membrane while obscuring undesired vegetation growing from said ground area upwardly around the object and while having inherent stability to remain in place without need for stakes or similar anchors. An additional feature is an insect barrier on the membrane which, in addition to the chamber, is a deterrent to insects crawling across the membrane to the plant.

An object of the present invention is to control growth around the base of both animate and inmate objects upstanding from the ground.

Another object is to enhance the growth of a plant while obscuring undesired vegetation growing around the plant.

A further object is create a growth-promoting micro-climate around the base of a plant.

Still another object is to attract and retain heat in a defined area immediately around the base of a plant thereby to enhance plant growth.

Another object is to create a growth-promoting chamber or envelope around the base of a plant and over the part of its root system adjacent to the main trunk or stem of the plant.

A further object is to provide a ground covering enclosure that has inherent stability to resist movement out of position.

Another object is to provide a portable ground cover which is inherently stable when positioned around a plant or other object without the need for stakes, fasteners or other stabilizing devices.

An additional object is to provide a plant cover having the other objectives stated herein and which is adaptable for use on both individual plants and row crows.

Yet another object is to improve water management in the care of plants, by insulating the soil around the base of the plant from the harsh effects of sun and wind thereby saving water, by reducing evaporation around the base of the plant and resultant mineral and salt build-up, by avoiding rain-caused soil crusting around the base of the plant, and by custom irrigation around the base of the plant.

Another object is to reduce the adverse effects of frost and erosion on the growth of plants.

A further object is to minimize the need for herbicides and other environmentally objectionable chemicals in the growing of plants and thereby to promote organic farming.

Another object is to repel crawling insects from attacking a plant.

A very important object is to recycle used automobile tires by using parts thereof in a ground covering enclosure.

Yet another object is to provide a durable, long lasting ground-covering enclosure for use around the base of plants and other upstanding objects so as to enhance desired plant growth and to obscure undesired vegetation.

These and other objects, features and advantages of the present invention will become apparent upon reference to the following description, accompanying drawings, and appended claims.

DESCRIPTION OF THE DRAWINGS

FIG. 1 is an isometric view of the ground cover of the present invention in position around a tree.

FIG. 2 is a top plan view of the ground cover of the present invention.

FIG. 3 is a side elevation or edge view of the ground cover shown in FIG. 2.

FIG. 4 is a vertical section taken along line 4—4 in FIG. 2.

FIG. 5 is a bottom plan view of the ground cover.

FIG. 6 is a fragmentary detailed section, partly in section, of the hose shown in FIG. 4.

FIG. 7 is an isometric view of a standard automobile tire, which may be new or used but which represents a used tire as is involved in the present invention.

FIG. 8 is a section of the tire taken on line 8—8 in FIG. 7.

FIG. 9 (a, b, and c) is an exploded view showing two annular sections cut from the tire of FIG. 7 in accordance with the method of the present invention.

FIG. 10 is a plan view of one of the sections shown in FIG. 9 and also illustrating additional steps of the subject method.

FIG. 11 is a bottom plan view of the ground cover of the present invention showing still more steps of assembly in accordance with the present invention.

FIG. 12 is an isometric of another embodiment of the ground cover of the present invention adapted for use on row crops but which has been foreshortened for illustrative convenience.

FIG. 13 is a vertical section taken along line 13—13 in FIG. 12.

DETAILED DESCRIPTION

A ground cover or ground covering enclosure in accordance with the present invention is identified by the numeral 20 in FIG. 1. The enclosure is shown around the trunk 22 of a tree 24, with the roots 26 of the tree being shown in FIG. 4 and with the ground being indicated by the numeral 28.

The ground covering enclosure 20 includes a generally frusto-conical ring or annular wall 34 (FIGS. 1 through 4) which has been cut out of an automobile tire 36 (FIG. 7) and thus is made of rubber. A more specific description of the relationship of the ring to the tire is discussed below. Although the described embodiment of the ground covering enclosure is advantageously made from a cut-out section of a used tire, it will be understood as the description proceeds that the principles of the present invention are not limited to making the ring from a used tire. Moreover, the ring need not be circular or any particular circumferential shape, but merely of a shape or shapes which circumscribes, or nearly circumscribes, the tree 24, plant, or other object being surrounded. Moreover, as described in the second embodiment, the ring need not be in one piece although for individual plants, a one-piece ring is preferred. In order to provide a complete description of the enclosure with reference to a used tire, the following description correlates the parts of the ground covering enclosure with the parts of an automobile tire.

The ring 34 (FIGS. 1 through 4) has an outer or lower annular edge 40, an inner upper annular edge 42 surrounding a large outer central opening 44, an outside S-shaped surface 46, an inside S-shaped surface 48, an outer or lower flange 50 and an upper or inner flange 52. Since the ring is a cut-out section of a used tire 36 (FIG. 7), it has re-enforcing plies and steel wires in the bead (FIG. 8). The ring also has a radial slit 66 (FIGS. 1 and 2) therein, which defines two separable ends 68 of the ring and a hole 70 extending through the ring adjacent to one of these ends.

Since the described embodiment of the ring 34 (FIGS. 1 through 4) is part of the sidewall of an automobile tire 36, it of course retains the characteristics of an automobile tire. Thus, the ring is of black rubber which makes it heat absorbing and retaining, an advantage utilized in the present invention, as will be more fully described hereinafter. Also, the weight of the ring in the embodiment shown in FIGS. 1–5 is that of a typical sedan tire, that is, in the order of two to three pounds, which again is an advantage for the ground covering enclosure 20 of this invention to provide stability in a manner to be subsequently described. Although sufficient weight to enable the ground cover to have inherent stability, while being light enough for ease of handling, is important for this invention, the exact weight is not critical as will be understood.

The ground covering enclosure 20 (FIGS. 1, 2, 4, and 5) also includes a membrane or sheet 80 of water and light pervious, and vegetation impervious, material. A product known as "weed cloth" is ideally suited for use as the membrane. This cloth is a woven, ultraviolet-resistant, plastic fabric of polypropylene fibers and is available in different grades. More specifically, the weed cloth used in the preferred embodiment is a product called "Polyspun XL" manufactured and sold by Landmaster, Inc., of 1905 West Dartmouth Avenue, Englewood, Colo. 80110. This cloth is approximately twenty-two mils thick, has a weight of about 3.70 ounces per square yard, and is of a premium polyester grade. The weed cloth described is black and is opaque against a dark background although its porosity and can be seen by holding it up to the light. It is of high tensile strength and does not deteriorate in the presence of moisture or other environmental conditions.

The membrane 80 (FIGS. 1, 2, 4, and 5) is circular in shape thereby having an outer circumferential edge 82. The membrane has a plurality of central triangular flaps 84 which are created by a comparable number of cuts radiating outwardly from the center of the membrane so as to define a plurality of ends which meet in the exact center of the membrane. Also, the membrane as a radial slit 85 continuous with one of the radiating cuts and extending to the outer edge of the membrane to define membrane ends 86. The central flaps are foldable in order to create a central inner opening 88 in the membrane. The membrane is positioned within the ring 34 so that the outer edge 82 of the membrane is adjacent to, and in contact with, the inner flange 52 of the ring; so that the central opening 88 in the membrane is concentric with the central opening 44 in the ring, and so that the slit 85 in the membrane is aligned with the slit 66 in the ring. The membrane is secured to the ring in the position described by an adhesive, preferably a silicone adhesive, indicated at 90 in FIG. 4.

A bridging strip 95 of the same material as the membrane (FIGS. 2 and 5) is secured by adhesive to both the undersurface of the membrane 80 and the inside surface 48 of the ring 34 and extends radially from adjacent to the center of the membrane to almost the lower or outer edge 40 of the ring. This strip is secured to one end 86 of the membrane and the corresponding end 68 of the ring and separably overlaps the other end 86 of the membrane and its corresponding end 68 of the ring. Although shown as a separate piece secured to the membrane, the bridging strip could be part of one end of the membrane. Thus, the strip allows the membrane and ring to be separated along their aligned slits 66 and 85, but when the ends of the membrane and the ring are in end-to-end relationship, the strip overlaps these ends to bridge the gaps created by the slits.

The ground covering enclosure 20 further includes an irrigation hose or tube 100 mounted within the ring 34. The hose has an inner closed end 102 adjacent to one of the ends 68 of the ring, a plurality of water outlets 104 spaced along the length of the hose and directed radially inwardly of the ring, and an outer end 106 extending through the hole 70 in the ring and exiting from the ring, as shown in FIGS. 1 and 2. The outer end of the hose extends about one foot from the ring, and a coupling 108 is attached to the outer end for connecting the hose to a main line 110, the latter being connected to a source of water, as indicated in FIG. 1. The hose is attached to the inside surface 48 of the ring, preferably by staples 112 and is located relatively close to the upper edge 42 of the ring, thereby being in spaced relation to the lower edge 40. It will be understood that the ends 102 and 106 of the hose 100 are located so as to allow the ends of the ring to be moved between their open and closed positions. The hose can be a drip irrigation hose, a soaker-type hose, or another type of conduit for conducting water and liquid-borne nutrients to the area within the ring.

The ground covering enclosure 20 preferably also provides an annular insect barrier 120 on the top surface of the membrane 80, as seen in FIGS. 1 and 2. This barter is preferably a strip of copper film adhesively secured to the membrane in circumscribing relation to its central opening 88. The barrier has spaced opposite ends adjacent to the slit 85 in the membrane thereby to allow separation of the ends of the membrane, as described above. Alternatively, the membrane can be coated with an insect repellent.

Method of Making Enclosure from Used Tire

As above indicated, the described embodiment of the ground covering enclosure 20 is made from a used automobile tire 36 (FIGS. 7 and 8). Before describing the method in detail, the parts of the tire are briefly identified. The tire thus has a tread 130, sidewalls 132, and beads 134. Each sidewall has an outside surface 136, an inside surface 138 and includes re-enforcing plies 140 and steel wires 142 located in the beads 134. Although a wide variety of tires is available for use in the present invention, one of the tires used in constructing an embodiment of the subject enclosure 20 is a four-ply, radial tubeless Centennial tire of size P185/75R14, with one polyester ply and two steel plies under the tread and one polyester ply in the sidewall. The invention is not limited to such specific tire, but the same is given by way of example only.

It is first to be understood that two rings 34 (FIG. 9) are obtained from a single automobile tire 36, but the method will be described with reference to making just one of these rings. Thus, the first step is to incise a circular cut 150 (FIGS. 7 through 9) in the sidewall 132 of the tire 36 along a line which is about two to three inches from the outer edge of the tread 130. Thus, the ring 34 is separated from the remainder of the tire, as shown in FIG. 9a and 9b. It is important to note that the cut line is spaced inwardly from the tread thereby to avoid a curved lip portion 152 of the sidewall and to result in an outer edge 40 of the ring which defines a cylindrical surface coaxial with the center of the ring. If this cut line is made too close to the edge of the tread, the outer edge of the ring will have a curvature which will produce a channel or gully circumferentially of the ring which will collect water in an undesired manner.

After the ring 34 has been removed from the remainder of the tire 36 (FIGS. 9a and 10), the slit 66 is cut in, and the hole 70 is drilled through, the ring. Following preparation of the ring in this manner, the ring and the membrane 80 are assembled as generally described below.

The membrane 80 is cut in circular shape from weed cloth and is further cut to provide the slit 85 and the flaps 84. The membrane is then placed over the opening 44 in the ring 34 and its outer edge 82 is secured to the flange 52 of the ring on the outside surface 136 of the sidewall 132, which becomes the inside surface 48 of the ring as used in the subject enclosure 20. In this manner, the membrane is stretched across the outer opening 44 in a plane which is generally parallel to the planes of the inner and outer edges 42 and 40. As shown in FIG. 4, however, the membrane is closely adjacent to the inner edge 42.

The bridging strip 95 is then secured to corresponding ends 68 and 86 of the membrane and the ring on the bottom and inside surfaces thereof, respectively. Lastly, the insect barrier 120 is secured to the top surface of the membrane in the position described above. Alternatively, the membrane could be provided with the bridging strip and the insect barrier prior to assembly with the ring.

Operation

In use, the subject ground covering enclosure 20 can be used around various objects upstanding from the ground 28. Although the object illustrated in FIG. 1 is a tree 24, the ground covering enclosure could be used around other plants or around inanimate objects such as a fire hydrant, telephone pole, or the like.

In use for the tree 24, the ring 34 and membrane 80 are separated by pulling apart their ends 68 and 86 so as to fit the ring and membrane around the tree trunk 22. The flaps 84 open up to receive the tree trunk but then close in circumferential engagement with the trunk, as shown in FIG. 1. Closure of the ring occurs because of the weight of the ring, that is, when the ring is opened by separating the ends of the ring, the elevated end returns to a closed position when the ring is in a horizontal position on the ground because the weight of the elevated end gravitates toward closed position. This is to be contrasted with a ring whose ends are resiliently biased to return to closed position because of the inherent resilience of the ring.

It is noted that the ring 34 is placed around the tree with the smaller diameter upper edge 42 up and with the larger diameter lower edge 40 down. In this way, in the described embodiment and depending on the size of tire 36 employed, the membrane is spaced upward from the ground by a distance of about 1½ inch, and the outer or lower edge 40 of the ring is spaced from the center of the tree a distance of about eleven inches. In any event, it is very important to the present invention that the ring and the membrane cooperate with the lower part of the tree trunk and the ground to define an enclosed chamber 170 beneath the enclosure and close to the ground. Although in the used-tire embodiment, the height of the membrane and thus of the chamber will be governed by the size of tire employed, the principles of the present invention involve the creation of a micro-climate in close proximity to the ground. Ideally, therefore, the height of the chamber should be no more than about eight to ten inches. Also, in the described position of the ground covering enclosure, the hose 100 is positioned within the chamber with its outlets 104 directed generally radially inwardly of the chamber. The coupling. 108 is then connected to a water line 110, preferably in a drip irrigation system.

Alternative Embodiment

Another embodiment of the present invention which is suitable for use with row crops is shown in FIGS. 12 and 13. The ground covering enclosure of this embodiment is identified by the number 180 and includes two elongated flexible L-shaped side walls 182 of heat attracting and retaining material, such as rubber. Each wall is preferably about eight to twelve feet in length and has a vertical flange 184 and a horizontal flange 186. The walls are intended to be used in pairs with their horizontal flanges resting on the ground 28 between rows of plants, as 24, and with their vertical flanges in opposed spaced relation on opposite sides of the plants in a row. The opposite ends of a pair of side walls are connected by end walls 188, as shown, or they can be flexed into convergent, contacting relation and fastened or held together by a rock or soil, not shown. Also, transverse straps 198 extend between and are connected to the side walls at spaced positions along the length thereof so as to maintain the pair of side walls in relatively fixed spaced relationship throughout their full lengths.

The side and end walls 182 and 188 (FIGS. 12 and 13) are preferably made from the recycled rubber of used tires, as 36, and thus are of a material having the characteristics of the material of the ring 34, namely, black rubber which is heat absorbing and retaining. Advantageously, the left-over tread 130 and marginal lips 152 of the used tire from which the rings 34 are formed is comminuted into crumb rubber, mixed with a polymer binder, and molded or extruded into the side and end walls. In this latter regard, it is of course well known how to recycle used rubber into useful rubber products so no further description is given of making the specific side and end walls.

An elongated rectangular membrane 190 is stretched across the opening defined by the spaced vertical side walls 184, extends the full length thereof, and is secured to their upper edges 192. This membrane is of the same material as the membrane 80, has openings for the plants 24, and serves the same purpose as membrane 80. The side walls, end walls 188, and the membrane define a chamber 199 which has the same function as the chamber 170. Still further, an irrigation hose 200 is mounted on one of the vertical flange 184 of one of the side walls 182 within the chamber, as with conduit 100. Insect barriers 202 are also provided on the membrane 190.

In use, the elongated lengths of side walls 182, half of which have the irrigation conduits attached and half without, are carded into the field, like irrigation pipe, and placed between the rows of crops 24 in the manner described. Thereafter, opposed pairs of side walls are connected by the end walls 188, or their ends are brought into contact and held together by rocks or soil, and the straps are attached at selected positions along the lengths of the side walls. A membrane 190 is then attached to each associated pair of side walls to form the chamber 199, the plants are guided through adjacent openings in the membrane, and the hose 200 is connected to a source of water.

The advantages of the subject ground covering enclosures 20 and 180 are numerous. First, the enclosure insulates the soil from the harsh elements of sun and wind by holding moisture in the soil, thereby slowing evaporation to a minimum and resulting in significant water savings. Tests indicate that the water savings can be as much as forty percent as compared with exposed soil. Also, it is to be noted that a continuous cycle of overhead watering followed by evaporation causes a buildup of harmful minerals and salts which reduces crop yields and eventually make the soil barren. With the subject enclosure, much less water is used and there is minimal evaporation. Water application with the subject ground cover can be adjusted to suit a grower's needs depending upon water availability, pressure and quantity needed.

In general, with particular reference to FIGS. 1, 4, 12 and 13, the chamber 170, or 199, acts as a greenhouse or hothouse in which is created a microclimate of higher temperature and humidity than in the surrounding environment. The sun's rays, filtered of ultraviolet radiation, pass through the membrane 80, or 190, and the rubber ring 34, or walls 182 and 188, absorbs and retains heat from the sun which is then transmitted into the chamber. Water from rainfall or from an external sprinkler system passes through the membrane of the chamber, and the irrigation hose 100, or 200, is used to add water. The hose is also useful for adding other liquid-borne nutrients.

The greenhouse-like chamber 170, 199 is located just above the root system 26 of the plants 24 so that the beneficial effects of moisture and heat are applied directly to the roots for maximum effect. This chamber also serves to repel insects from entering the chamber and attacking the plant. Whether the ground covering enclosure 20, or 180, is used around a plant 24, or around an inmate object such as a mailbox, the membrane 80, 190 obscures undesired vegetation, such as weeds, and actually precludes their upward growth because the membrane is impervious to such vegetation. In this regard, it is recalled that the membrane is opaque against the dark earth background so that it is not possible to see through the membrane to the area underneath. Also, in the embodiment of FIG. 1, the strip 95 closes the gap between the ends 86 and 68 of the membrane and the ring, and the flaps close the gaps around the object, so that vegetation cannot enter into these gaps and grow up through the membrane or ring. In this manner, the base of the object, whether it be a plant or an inmate item is maintained in a neat and clean manner.

An important advantage of the subject device is a saving of the labor which is normally required to maintain properly either the growing plants or the undesired growth of weeds. By placing a ground covering enclosure 20, 180, around a tree, post, or pole, it eliminates the need for handling, weed whacking, and replacing damaged trees, thus resulting in significant savings of labor and other costs.

Ground covering enclosures 20 of FIGS. 1-6 can be used around mailboxes, fence posts, signs, poles, trees, plants, and any other object where weeds or plant growth are a problem. The enclosure of FIGS. 12 and 13 can be used for field crops The enclosures constructed in accordance with this invention are practically indestructible and will last for many years withstanding their expose to all the elements.

Because the subject ground covering enclosures 20, 180 obscures weeds and prevents their growth, herbicides are unnecessary around the base of the plant or other upstanding objects where weed control is important. As such, farmers and growers do not need to spray around trees with herbicides so they can employ organic farming techniques to a greater degree.

Tests also prove the heat attraction and retention ability of the enclosure, as 20. On a sunny day with outside temperatures averaging seventy degrees F., it has been shown that the temperature under the enclosure, in the chamber 170, is as much as twenty degrees higher than the temperature outside the enclosure. Even on a cold night, with temperatures in the mid-thirties, the temperature in the chamber is still six degrees warmer under the enclosure with such heat retention enhancing plant growth. With the heat added to the plant under the enclosure, most frost damage which occurs below the freezing-point temperatures is eliminated.

The ground covering enclosure 20, 180 also helps soil control, particularly with regard to erosion which is minimized with the enclosure. Tests conducted in heavy adobe soil show that two or three days after a rain, a crust is formed in uncovered soil that makes seed penetration difficult. In contrast, under the enclosure, within the chamber 170, no such crust is formed.

There are additional advantages to the enclosure 20, 180 in windy climate. Testing shows that the enclosure acts as a shelter from harsh, drying winds which causes moisture to evaporate quickly. Also, the weight of the ring is such that it remains in a stable position around a tree or other object and does not blow up, around, or away like other lightweight plant covers might do.

Although preferred embodiments of the present invention have been shown and described, various modifications and substitutions may be made thereto without departing from the spirit and scope of the invention. Accordingly, it is to be understood that the present invention has been described by way of illustration and not limitation.

What is claimed is:

1. An enclosure for covering undesired vegetation around objects upstanding from the ground, said objects including both desired plants as well as inmate objects and said enclosure being adapted to promote the growth of a plant when it is the object, comprising:

a water and light pervious, vegetation impervious membrane adapted to receive the object upstanding from the ground through the membrane with said membrane circumferentially engaging the object, and means engageable with the ground adjacent to the object for supporting the membrane in spaced relation to the ground so that the object, the membrane and the ground form a chamber around the base of the object in which the temperature and humidity are elevated thereby to promote plant growth in the ground area under the membrane while obscuring undesired vegetation growing from said ground area upwardly around the object.

2. The enclosure of claim 1, wherein the ground engageable means is annular.

3. The enclosure of claim 1, wherein the ground engageable means includes a pair of side walls adapted to be positioned in upstanding relation to the ground, spaced on opposite sides of the object, and connectable at adjacent opposite ends thereof.

4. The enclosure of claim 1, wherein the ground engageable means is a rubber wall.

5. The enclosure of claim 1, wherein the ground engageable means is an annular section of the side wall of an automobile tire.

6. The enclosure of claim 5, wherein the ground engageable means is formed by making an annular cut in the side wall of an automobile tire so as to separate said annular section from the tread and remainder of the tire, wherein the cut results in an annular edge of the side wall section which constitutes a ground-engaging edge of the side wall section, wherein the side wall section has an inner annular edge which was one of the beads of the tire and which is spaced inwardly of said ground-engaging edge, wherein the side wall section has an inner surface which faces inwardly of the chamber but which was the outside of the side wall of the tire, and wherein the side wall section has an outer surface which faces outwardly of the side wall section and which was the inside of the side wall of the tire.

7. The enclosure of claim 1 further including:

water supplying means, and means mounting the water supplying means on the ground-engaging means and within the chamber.

8. The enclosure of claim 7, wherein the water supplying means includes an inlet projecting outwardly from the ground engagable means.

9. An article of manufacture for use in covering undesired vegetation around an object upstanding from the ground and for enhancing root growth when the object is a plant, comprising:

upstanding wall means adapted to fit around the object upstanding from the ground, said wall means being adapted to rest on the ground and extending upwardly to define a central opening adapted to receive said upstanding object when the wall is positioned therearound;

a sheet of material through which water and light can pass but vegetation cannot positioned over said opening in upwardly spaced relation to the ground and having a small central opening adapted to receive such upstanding object with the sheet in circumferential engagement therewith; and means for attaching the sheet to the wall means, said wall means and sheet constituting means cooperating with the object and the ground for forming an enclosure within which growing conditions for a surrounded plant can be enhanced while obscuring undesired vegetation.

10. The article of claim 9, further including:

a hose attached to the wall means interiorly of the enclosure for delivering water to the ground under the sheet.

11. The article of claim 9, wherein the wall means is made of heat-absorbing material.

12. The enclosure of claim 9, wherein the wall means includes weight means for resisting movement of the wall means from a position around an object therewithin.

13. The enclosure of claim 9, further including:

insect barrier means on the sheet.

14. A ground covering enclosure for obscuring undesired vegetation around plants as well as inanimate objects upstanding from the ground and for promoting the growth of a plant when the object is a plant, comprising:

a water and light pervious, vegetation impervious weed cloth having means centrally thereof for receiving the plant or other object in circumferential engagement therewith;

a peripheral heat-absorbing wall including means for engaging the ground circumferentially of such an object;

means for supporting the cloth on the wall in spaced relation to the ground so that the object, the cloth and the ground form an enclosed chamber around the base of the object;

a drip hose; and means mounting the hose on the inside of the wall and within the chamber for delivering water and other liquid-borne nutrients to the ground around the plant, thereby to create a micro-climate of higher temperature and humidity in the chamber similar to a greenhouse whereby to promote plant growth in the ground area under the membrane while obscuring undesired vegetation growing from said ground area upwardly around the object.

15. The article of claim 14, wherein the wall means has a weight approximately equal to the weight of an annular section of the side wall of a rubber automobile tire, which section has been separated from the remainder of the tire by cutting around the tire adjacent to the tread.

16. A ground covering enclosure made from a rubber automobile tire, said tire having a tread, side walls, and a pair of beads, each side wall having an outside generally convex surface and an inside generally concave surface, said enclosure being adapted to surround an object upstanding from the ground so as to block and obscure weed growth around the object and to enhance plant growth when the object is a plant, comprising:

a ring of rubber cut from one of the side walls of such a tire by cutting along a circular line coaxially of the tire and adjacent to but outside of the tread in order to separate the ring from the tread whereby the cut line defines an outer annular ground-engaging edge of the ring, the bead defines an inner annular edge of the ring surrounding a central opening in the ring, the inside surface of the side wall defines the outer surface of the ring, and the outside surface of the side wall defines the inner surface of the ring, the ring having a radial slit therein defining separable end portions of the ring; and a closely woven sheet of fabric through which water can pass but vegetation cannot stretched across the ring over the central opening and attached to the inner surface of the ring adjacent to said inner edge in spaced parallel relation to said ground-engaging edge, the sheet having centrally located separable flaps movable between closed positions coplanar with the remainder of the sheet and open positions folded back from their coplanar positions to define an opening in the sheet, the sheet also having a radial slit therein aligned with the slit in the ring and defining separable end portions of the sheet, whereby the ends of the ring and the sheet can be separated to enable the opening in the sheet to receive the object upstanding from the ground with the flaps in circumferential engagement with the object and whereby when the ends of the ring and the sheet are brought back together, the ring and the sheet constitute means cooperating with the ground and the object to form a chamber in which a growth-enhancing micro-climate can be created upon application of moisture and heat.

17. The enclosure of claim 16, further including:

an irrigation hose extending along and attached to the inner surface of the ring having an inner closed end adjacent to one of the ends of the ring, an opposite outer end exiting from the ring adjacent to the other end of the ring and a plurality of water outlets spaced along the length of the hose and directed inwardly of the ring, and means for connecting the outer end of the hose to a source of water.

18. The enclosure of claim 16, further including:

means releasably bridging the gap between the ends of the sheet and the ends of the ring when said ends are in end-to-end relation with each other so as to close the gaps between the ends of the sheet and the ends of the ring.

19. An enclosure for covering undesired vegetation around objects upstanding from the ground, said objects including both desired plants as well as inanimate objects and said enclosure being adapted to promote the growth of a plant when it is the object, comprising:

a cover sheet adapted to receive the object upstanding from the ground through the sheet with said sheet circumscribing the object, and means engageable with the ground adjacent to the object for supporting the sheet in spaced relation to the ground so that the object, the sheet and the ground form a chamber around the base of the object in which the temperature and humidity are elevated thereby to promote plant growth in the ground area under the sheet while obscuring undesired vegetation growing from said ground area around the object.

20. The enclosure of claim 19, wherein the ground engageable means is annular.

21. The enclosure of claim 19, wherein the ground engageable means is a rubber wall.

22. The enclosure of claim 19, wherein the ground engageable means is annular and made from an automobile tire.

23. The enclosure of claim 19 further including:

means within the chamber for supplying liquid to the chamber.

24. The enclosure of claim 19, wherein the sheet is a membrane capable of transmitting light therethrough but capable of obscuring and blocking the growth of said undesired vegetation.

25. The enclosure of claim 19, wherein the ground engageable means includes a pair of side walls adapted to be positioned in upstanding relation to the ground, spaced on opposite sides of the object, and connectable at adjacent opposite ends thereof.

26. The enclosure of claim 25, wherein the side walls are elongated for extending alongside a row of crops on opposite sides thereof, wherein the sheet is rectangular, extends between the side walls, and has openings for receiving individual crops, and wherein the ground engageable means includes end walls interconnecting the side walls at opposite ends thereof.

27. The enclosure of claim 26, wherein the side walls are L-shaped in transverse cross-section.

28. The enclosure of claim 26, wherein there are means extending within the chamber along a side wall thereof for supplying water to the chamber.

29. The enclosure of claim 26, wherein the side walls are made of rubber.

30. A ground covering enclosure adapted to surround an object upstanding from the ground so as to block and obscure weed growth around the object and to enhance plant growth when the object is a plant, comprising:

rubber tire means providing a ring of rubber having an annular outer ground-engaging edge, an annular inner edge surrounding a central opening, annular outer and inner surfaces, and a radial slit therein defining separable end portions of the ring; and a cover sheet extending across the ring over the central opening and attached to the ring adjacent to said inner edge in spaced relation to said ground-engaging edge, the sheet also having a radial slit therein aligned with the slit in the ring and defining separable end portions of the sheet, whereby the ends of the ring and the sheet can be separated to enable the opening in the sheet to receive the object upstanding from the ground whereby when the ends of the ring and the sheet are brought back together, the ring and the sheet constitute means cooperating with the ground and the object to form a chamber in which a growth-enhancing micro-climate can be created.

31. The enclosure of claim 30, wherein the rubber tire means has an annular bead constituting said inner edge, wherein the sheet is a weed cloth having centrally located separable flaps movable between closed positions coplanar with the remainder of the sheet and open positions folded back from their coplanar positions to define an opening in the sheet.

* * * * *